(12) United States Patent
Woodward et al.

(10) Patent No.: US 12,556,382 B2
(45) Date of Patent: Feb. 17, 2026

(54) QUANTUM NETWORK AND A QUANTUM AUTHENTICATION SERVER

(71) Applicant: Kabushiki Kaisha Toshiba, Tokyo (JP)

(72) Inventors: Robert Ian Woodward, Cambridge (GB); Benjamin Marsh, Cambridge (GB); James F. Dynes, Cambridge (GB); Zhiliang Yuan, Cambridge (GB); Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 397 days.

(21) Appl. No.: 17/886,625

(22) Filed: Aug. 12, 2022

(65) Prior Publication Data
US 2023/0275755 A1    Aug. 31, 2023

(30) Foreign Application Priority Data
Feb. 25, 2022  (GB) .................................... 2202649

(51) Int. Cl.
*H04L 9/08* (2006.01)
(52) U.S. Cl.
CPC ............ *H04L 9/0855* (2013.01); *H04L 9/085* (2013.01); *H04L 9/0866* (2013.01)
(58) Field of Classification Search
CPC ..... H04L 9/0852; H04L 9/083; H04L 9/0833; H04L 9/0819; H04L 9/0822; H04L 9/08; H04L 9/0816
See application file for complete search history.

(56) References Cited

U.S. PATENT DOCUMENTS 7,457,416 B1 * 11/2008 Elliott .................. H04L 9/0852
380/278
8,483,394 B2    7/2013 Nordholt et al.
(Continued)

FOREIGN PATENT DOCUMENTS

CN         109787763 A     5/2019
JP      2008-306633 A    12/2008
(Continued)

OTHER PUBLICATIONS

British Combined Examination and Search Report issued Jul. 28, 2022 in GB Application No. 2202649.6 filed on Feb. 25, 2022, 5 pages.
(Continued)

*Primary Examiner* — Tae K Kim
(74) *Attorney, Agent, or Firm* — Oblon, McClelland, Maier & Neustadt, L.L.P.

(57) ABSTRACT

A server configured to provide a pre-shared key "PSK" with a first user node, to allow a first user node and a second user node to share a PSK, the server comprising:
  a network interface; an authentication unit; an encryption unit; a key management system and a quantum key distribution unit,
  the authentication unit being configured to receive a request for authentication, via the network interface, of a first channel between a first user node and the server,
  the quantum key distribution unit being configured to allow a quantum key to be distributed between the first user node and the server, the quantum key being sifted using communication over the authenticated first channel to establish a first quantum key for the first user and server,
  the key management system being configured to provide a first PSK for the first user to allow the first user to authenticate with the second user,
(Continued)

the encryption unit being configured to encrypt the first PSK with the quantum key to send to the first user node via the network interface.

15 Claims, 13 Drawing Sheets

(56) References Cited

U.S. PATENT DOCUMENTS

| | | | |
|---|---|---|---|
| 8,738,898 | B2 | 5/2014 | Herwono et al. |
| 2005/0259825 | A1* | 11/2005 | Trifonov .............. H04L 9/0858 380/277 |
| 2009/0175452 | A1 | 7/2009 | Gelfond et al. |
| 2009/0316910 | A1* | 12/2009 | Maeda ................ H04L 9/0891 380/279 |
| 2011/0231665 | A1 | 9/2011 | Wiseman |
| 2013/0101121 | A1* | 4/2013 | Nordholt ............. H04L 9/0852 380/279 |
| 2014/0089663 | A1* | 3/2014 | Tanizawa ........... H04L 63/0428 713/168 |
| 2016/0218867 | A1* | 7/2016 | Nordholt ............. H04L 9/0852 |
| 2016/0226846 | A1* | 8/2016 | Fu ........................ H04L 63/062 |
| 2016/0234009 | A1* | 8/2016 | Li ........................ H04L 9/001 |
| 2017/0338951 | A1 | 11/2017 | Fu et al. |
| 2019/0379463 | A1 | 12/2019 | Shields et al. |
| 2019/0394031 | A1* | 12/2019 | Deng .................. H04L 9/0852 |
| 2022/0345300 | A1* | 10/2022 | Inamdar .............. H04L 9/0838 |

FOREIGN PATENT DOCUMENTS

| | | |
|---|---|---|
| JP | 2013-539324 A | 10/2013 |
| JP | 2013-544479 | 12/2013 |
| WO | WO 2021/090025 A1 | 5/2021 |

OTHER PUBLICATIONS

Peev et al., "The SECOQC quantum key distribution network in Vienna", New J. Phys. 11, 075001, 2009, 38 pages.

Wang et al., "Experimental Authentication of Quantum Key Distribution with Post-quantum Cryptography", npj: Quantum Information, 7 pages, 2021, arXiv:2009.04662.

Constantin et al., "An FPGA Based 4 Mbps Secret Key Distillation Engine for Quantum Key Distribution Systems", J Sign Process Syst 86, 2017, 15 pages.

Cui et al., "An authentication scheme with high throughput based on FPGA for a practical QKD system", Optik 126, 2015, pp. 4747-4750.

Wegman et al., "New hash functions and their use in authentication and set equality", Journal of Computer and System Sciences 22, 1981, pp. 265-279.

Shoup, "On Fast and Provably Secure Message Authentication Based on Universal Hashing", Advances in Cryptology—CRYPTO'96, Lecture Notes in Computer Science 1109, Dec. 1996, 12 pages.

Bernstein, "The Poly1305-AES Message-Authentication Code", Lecture Notes in Computer Science, vol. 3557, 2005, 18 pages.

Carter et al., "Universal classes of hash functions" Journal of computer and system sciences, 18(2), 1979, pp. 143-154.

Dynes et al., "Cambridge quantum network", npj: Quantum Information, 5(1), 2019, 8 pages.

Needham et al., "Using encryption for authentication in large networks of computers", Communications of the ACM, 21(12), Dec. 1978, pp. 993-999.

Japanese Office Action issued on Oct. 31, 2023 in Japanese Patent Application No. 2022-136134 (with unedited computer-generated English translation), 12 pages.

United Kingdom Examination Report issued Jul. 10, 2024 in United Kingdom Patent Application No. GB2202649.6, 5 pages.

Office Action mailed May 27, 2025, in Japanese Application No. 2024-116983 filed Jul. 22, 2024 (w/English translation).

Office Action mailed May 1, 2025, in United Kingdom Application No. 2202649.6.

Poppe et al., QIT4N-O-035, Draft D2.2 Technical Report on QIT4N use case part 2: Quantum Key Distribution Network (output of 4th FG-QIT4N meeting), Jun. 15-26, 2020, 55 pages.

Solomons et al., "Scalable authentication and optimal flooding in a quantum network", Jan. 28, 2021, 17 pages.

* cited by examiner

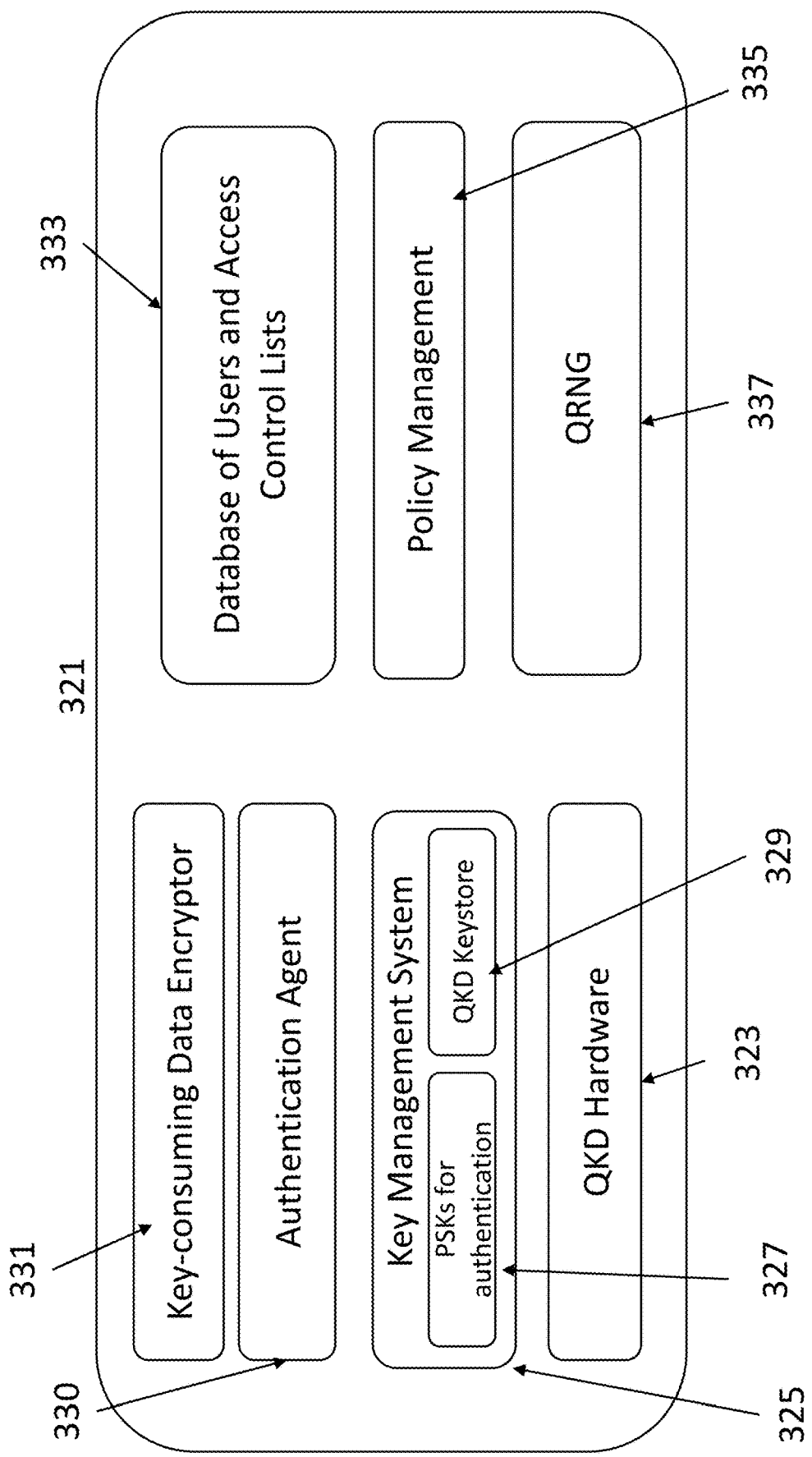

QUANTUM NETWORK AND A QUANTUM AUTHENTICATION SERVER

This application claims priority from GB application number GB 2202649.6 the contents of which are herein incorporated by reference.

FIELD

Embodiments described herein relate to a Quantum Network and Authentication Server

BACKGROUND

Quantum key distribution is a technology for generating perfectly random quantum keys at two remote nodes, which can be used for data encryption to ensure secure communications. The basic operating principle of QKD relies on encoding and measuring quantum states, followed by discussion between the two nodes over an authenticated classical channel.

DETAILED DESCRIPTION

Embodiments will now be described with reference to the following figures in which:

FIG. 3A is a schematic of a user node and FIG. 3B is a schematic of a QAS;

Figure 8:
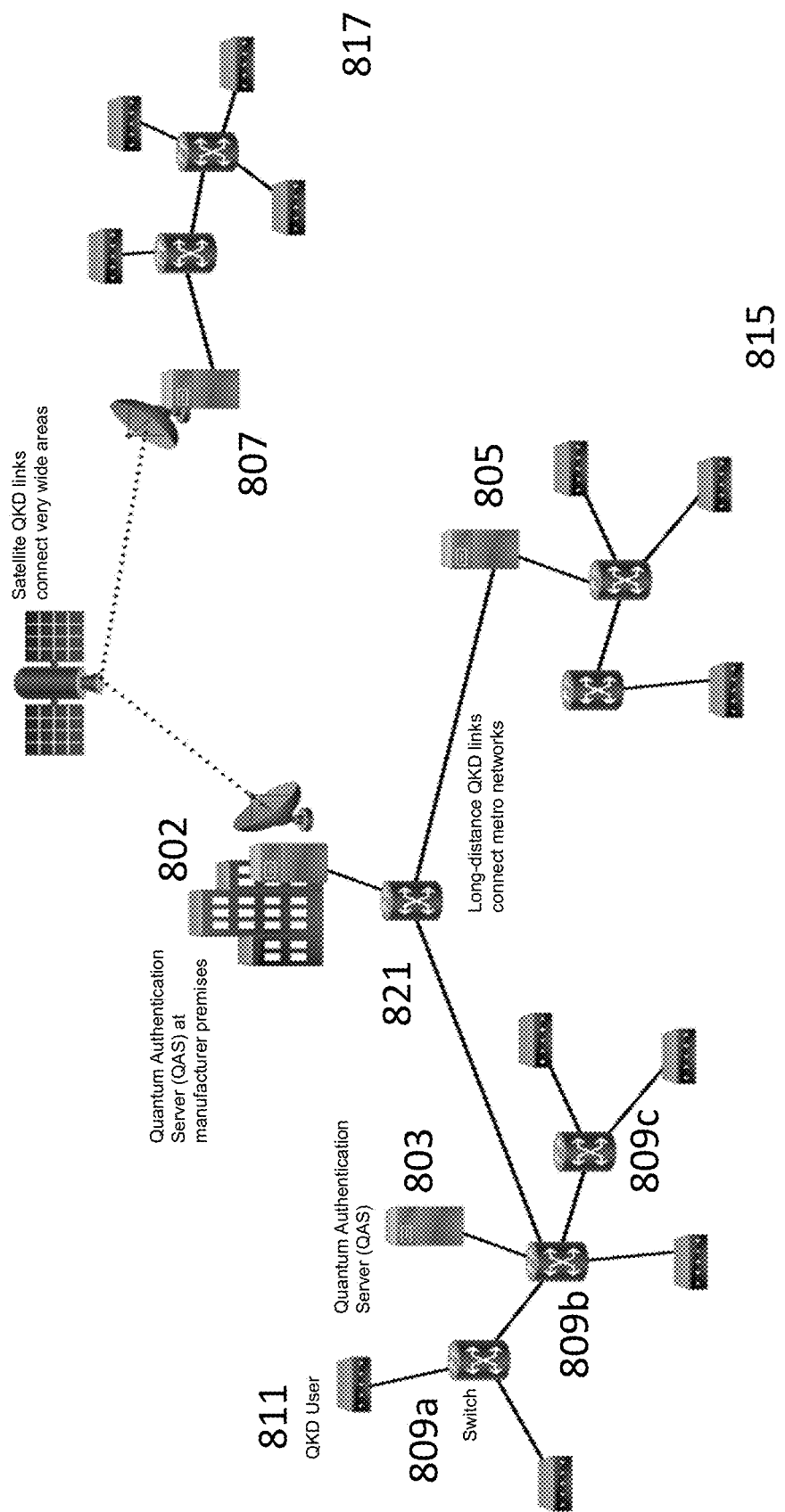
Figure 9:
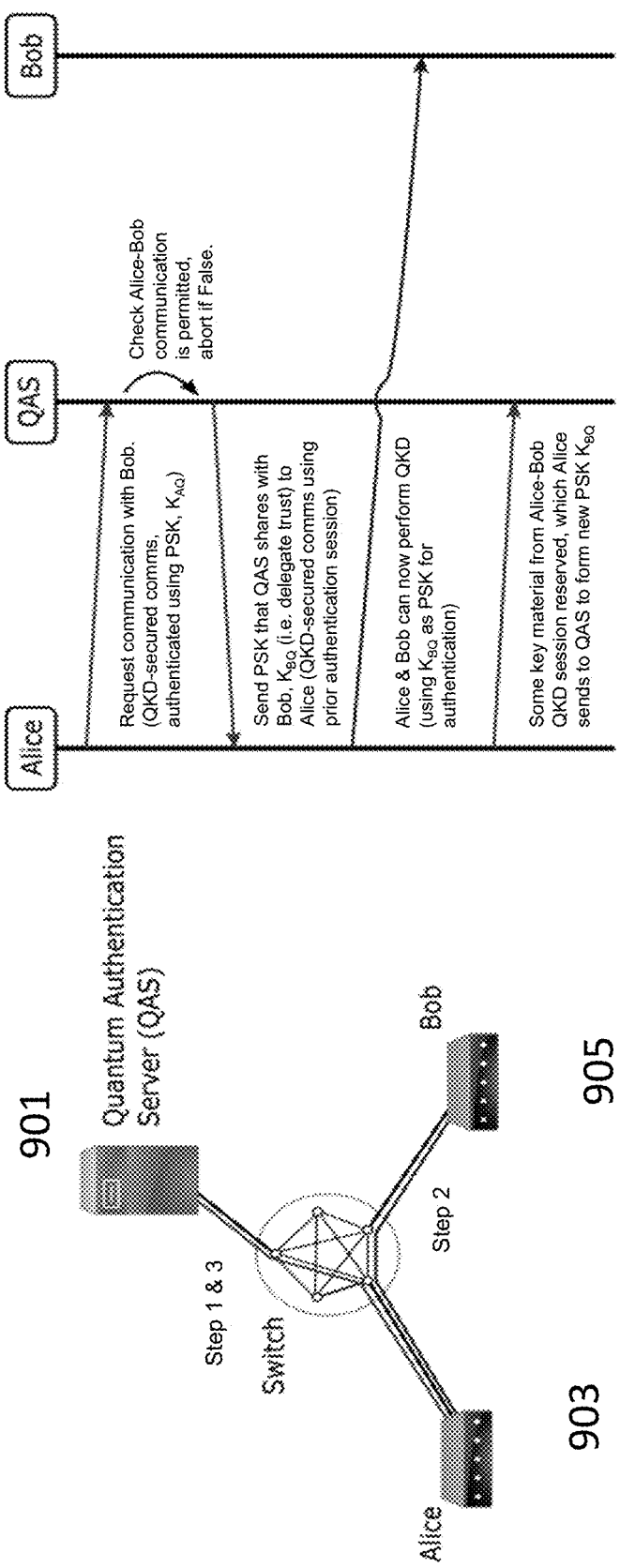
Figure 10:
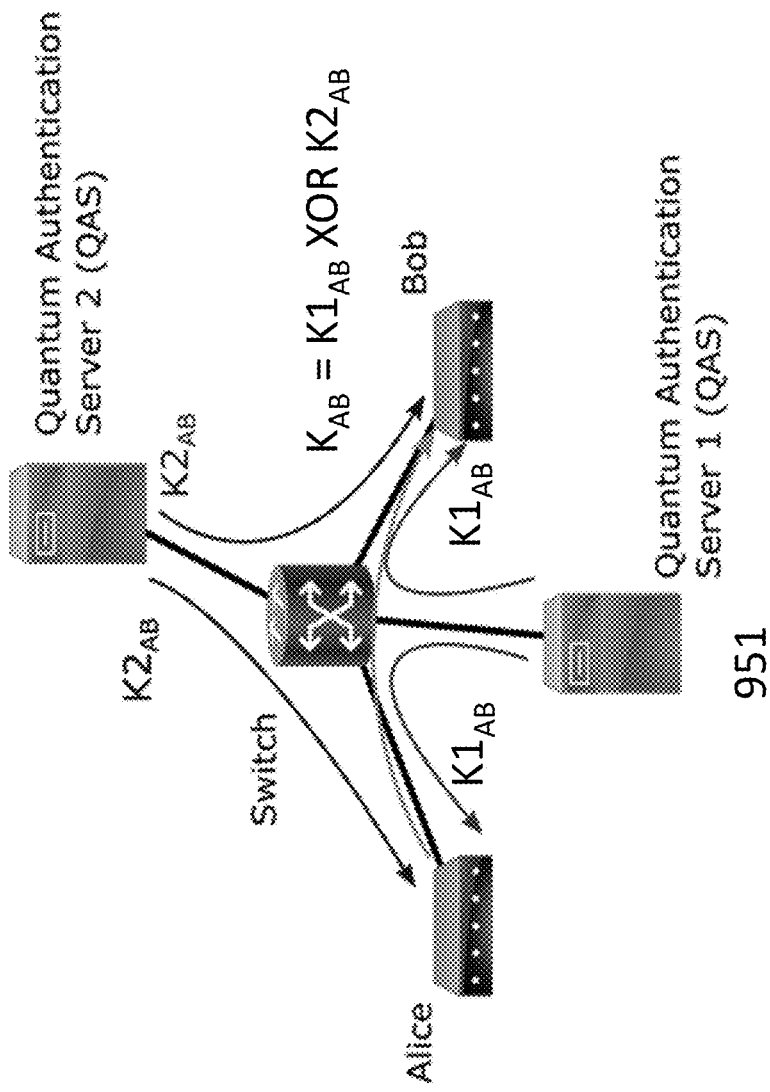

FIG. 8 schematic of a large scale network comprising three sub networks each with their own QAS in accordance with an embodiment;

FIG. 9 is a schematic showing the messages passed between the QAS and two user nodes in a sparse network; and FIG. 10 is a schematic showing a network where the key shared between two user nodes comprises PSKs from two QASs.

In an embodiment, a server is configured to provide a pre-shared key "PSK" with a first user node, to allow a first user node and a second user node to share a PSK, the server comprising:

a network interface; an authentication unit; an encryption unit; a key management system and a quantum key distribution unit, the authentication unit being configured to receive a request for authentication, via the network interface, of a first channel between a first user node and the server, the quantum key distribution unit being configured to allow a quantum key to be distributed between the first user node and the server, the quantum key being sifted using communication over the authenticated first channel to establish a first quantum key for the first user and server, the key management system being configured to provide a first. PSK for the first user to allow the first user to authenticate with the second user, the encryption unit being configured to encrypt the first. PSK with the quantum key to send to the first user node via the network interface.

For PSK encrypted communications, two parties who wish to communicate will both need to have access to the same private pre-shared key. To ensure security this means that there needs to be a secure way of installing a PSK between two parties who wish to use PSK.

Quantum key distribution (QKD) is a technology for generating perfectly random quantum keys at two remote nodes, which can be used for data encryption to ensure secure communications. The basic operating principle of QKD relies on encoding and measuring quantum states. This is then followed by discussion between the two nodes over an authenticated classical channel, which enables them to detect the presence of an eavesdropper. Part of the discussion is a process called sifting which is where the two nodes throw away measurements where the encoding basis and the decoding basis differed.

A requirement for QKD, therefore, is that the two users can authenticate each other. This means that they can, without doubt, verify the classical messages they receive were sent by the other party and not tampered with in transit. In other words, this avoids a man-in-the-middle attack. Authentication could be done using public key cryptography (e.g. RSA), but this is not the preferred solution due to known weaknesses in such approaches to quantum computers. Instead, QKD systems more commonly authenticate each other using a pre-shared symmetric key (PSK).

As QKD is a nascent technology, the majority of QKD systems to date operate over a single point-to-point link. Pre-shared key material is thus installed by the manufacturer when setting up the link and this is used for initial authentication. (Numerous algorithms exist for using pre-shared key material to authenticate messages and users.) Once authenticated QKD starts, additional PSK material can be built up between the users and stored for subsequent authentication sessions.

Quantum networks are an essential next step for QKD technology, where numerous QKD systems will be interconnected to permit quantum-secure communications between a number of users. This could be an optically switched network, where each user possesses a QKD system and the quantum links between them are formed by optical switching. These quantum channels between users could be optical fibres, or alternatively, free-space links, potentially even via a satellite between nodes 1000s km apart. However, there is a need to make sure that the classical communication channels are also secured. The process of installing a new QKD user into a network could require the manufacturer to visit each of the other QKD nodes and manually install a pre-shared symmetric key into them that is shared with the new QKD system. This is not scalable as each possible QKD system pairing would need a separate PSK to be installed, requiring N(N−1)/2 PSKs for a network of N nodes.

The above server is a quantum authentication server which allows a PSK to be installed in a user node using QKD. Installing a PSK via QKD maintains the security but avoids the need for a PSK to be installed by visiting a node to physically install a PSK. The quantum authentication server, providing that it is trusted, can store/generate or access PSKs to be provided via QKD to two nodes which allows the two nodes to be able to authenticate one another and thus safely communicate over a classical channel.

In one embodiment, the key management system itself is configured to generate a PSK for sharing between the first and second user nodes. This can then be sent to the first user node and the second user node. This allows the network to scale to allow further user nodes to be added and only the added nodes needs to have a PSK installed that allows it to authenticate with the QAS. Once a new node can authenticate with the QAS, then it is possible for it to open a secured authenticated channel with all other nodes which also share a PSK with the QAS. This is because the QAS can share a key with any two nodes with which it can open a secured authenticated channel.

For example, the authentication unit is configured to send a request for authentication, via the network interface, of a second channel between the second user node and the server, the quantum key distribution unit being configured to allow a quantum key to be distributed between the second user node and the server, the quantum key being sifted using communication over the authenticated second channel to establish a second quantum key for the second user node and server, the encryption unit being configured to encrypt the first PSK with the second quantum key to send to the second user node via the network interface.

Thus a key generated by the QAS can be shared between a first user node and a second user node.

In a further embodiment, the first PSK may have been pre-shared with the second user node prior to sending to the first node. For example, if the QAS and second user node are not able to contact one another to allow a first key to be sent from the QAS to both the first user node and the second user node, the QAS can send to the first node, the PSK that it already shares with the second node to allow the first and second nodes to authenticate one another.

In an embodiment, a PSK is discarded once it is used for authentication. Therefore, in an embodiment, a new PSK or multiple new PSKs are generated by the QKD process. For example, the first quantum key has a first length and the quantum key distribution unit is configured to distribute a key which is longer than the first length, the remainder of the key being saved as at least one PSK for further authentication between the server and the first user node.

In an embodiment, the server, further comprises an access control unit, the access control unit being configured to store information indicating whether two user nodes are allowed to share a PSK, the server being configured to accept or decline a request from a user node for obtaining a shared key by referring to the information stored in the access control unit.

In some embodiments, for example, if a node wished to contact a node which is relatively far away, the server may be configured to contact a further server to determine whether to accept or decline a request from a user node to obtain a shared key. The further server may be configured to control access to a subgroup of nodes.

In a further embodiment, the server further comprises a policy unit configured to provide information to control at least one of the quantum key length, a PSK key length and information to be sent with the PSK.

In an embodiment, the quantum key distribution unit comprises at least one of:

an encoder, said encoder being configured to encode information on light, wherein the information is encoded by randomly selecting one state from a plurality of states to send to said user node, the light leaving said server in pulses which contain on average less than one photon; and a decoder, said decoder being configured to receive light pulses which contain on average less than one photon and decode information from said light pulses by measuring said light pulses, wherein the measurement basis for the measurement are randomly selected from a set of measurement basis to allow measurement of the states used to encode the information, the quantum key distribution unit further comprising a sifting unit configured to allow the server to compare the basis it used for encoding or decoding with that used by the user node for decoding or encoding, the quantum key distribution unit being configured to discard the information from pulses where the encoding basis and the decoding measurement basis did not match.

Thus, the server may have an encoder and the user nodes provided with decoders (or vice versa). In further embodiments, the server may be provided with a decoder and an encoder so that QKD may be performed with nodes that only have an encoder or only have a decoder. The encoder/decoder may be configured to perform QKD using polarisation or phase.

In a further embodiment, a network is provided comprising a first server, a plurality of user nodes and at least one switch, the at least one switch being configured to allow selective connection between any two of said user nodes and any of said nodes and the server, wherein each of the user nodes comprises a quantum key distribution unit, a network interface and an authentication unit, the first server being a QAS as described above.

In a further embodiment, the network may further comprise at least one further server, said at least one further server also being a QAS as described above, wherein the first server is configured to send a query to the further server when the first server receives a request from a user node for a shared PSK which it cannot satisfy.

In the above network, the first user node, in response to a request for a PSK to authenticate with a second user node receives a PSK from the two servers, the first node forming a combined PSK from the two servers, the second user node also deriving the combined PSK to allow the first node and the second node to authenticate. The two PSKs may be formed by an operation such as an XOR operation. This means that the first and second user nodes can securely communicate even if one of the servers is compromised. The second node can obtain the two PSKs via QKD encrypted communications from the two QASs or the PSKs may already be stored on the second user node, for example if they are PSKs for authentication with the two QASs and the second user node.

The network may comprise a plurality of further servers, wherein the first server and the plurality of first servers are arranged in a hierarchy and the first server is configured to send a query to another server above it in the hierarchy when the first server receives a request from a user node for a shared PSK which it cannot satisfy.

Communication through the network is controlled by switches, these switches may be separate components or may be provided within one or more of the QAS and or user nodes.

The user nodes may also have further functionality. For example they may be a file server or a quantum computer.

In an embodiment, the network comprises a plurality of sub networks and said sub networks are linked by communication channels. For example the communication channels may be long distance channels (>1000 km) or satellite links.

In a further embodiment a method of sharing a pre-shared key "PSK" between a first node and a second node in a network is provided, the method comprising:
authenticating a first channel between the first node and a server;
performing QKD between the server and the first node to establish a first quantum key;
encrypting a first PSK at the server to share between the first node and the second node with the first quantum key; and
sending the encrypted PSK to the first node.

As explained above, the first PSK may have been pre-shared with the second user node. In yet further embodiment, the method may further comprise authenticating a second channel between the second node and a server;
performing QKD between the server and the second node to establish a second quantum key;
encrypting the first PSK at the server to share between the first node and the second node with the second quantum key; and
sending the encrypted PSK to the second user node.

The above allows a fully secure and scalable quantum network to be realised. The above allows an authentication system for QKD networks based on a trusted authority server generating a random number which is sent to users over a QKD-secured link for them to use as a pre-shared key (PSK) for authentication.

Further, the above QAS allows the provision of: a scalable information-theoretic secure communication network using PSK for authentication and QKD to grow keys to use for data encryption, where the initial PSK for user-to-user QKD is obtained through a trusted authority server; and An optically switched QKD network with authentication provided through network communication with a trusted authority server;

The above QAS provides a trusted authority node for a quantum communication network, possibly comprising, but not limited to: a quantum random number generator, a key store of PSKs for authentication with users on the network; a database of network users and access control list to define who can communicate with whom; authentication policy management; ability to include metadata with PSKs for policy-controlled authentication such as enforcing time-limited QKD sessions or handling quality of service (QoS) requirements.

Use of the aforementioned trusted authority/quantum network design to control authenticated user access to quantum resources on the network, such as sessions on file servers, quantum computers or quantum sensing capabilities.

A quantum communication network can be produced using the above comprising multiple trusted authorities, arranged in a hierarchical manner and connected over QKD links. Long distance links could be connected via twin-field QKD or satellite QKD. The aforementioned quantum network where network functionality and optical switching is controlled by software, for example using software defined networking (SDN).

In further embodiments, a quantum network is provided including at least two trusted author servers, such that PSK authentication keys are obtained between users by performing an XOR operation on two independent PSK keys, mitigating against the threat of a compromised trusted authority.

Figure 1:
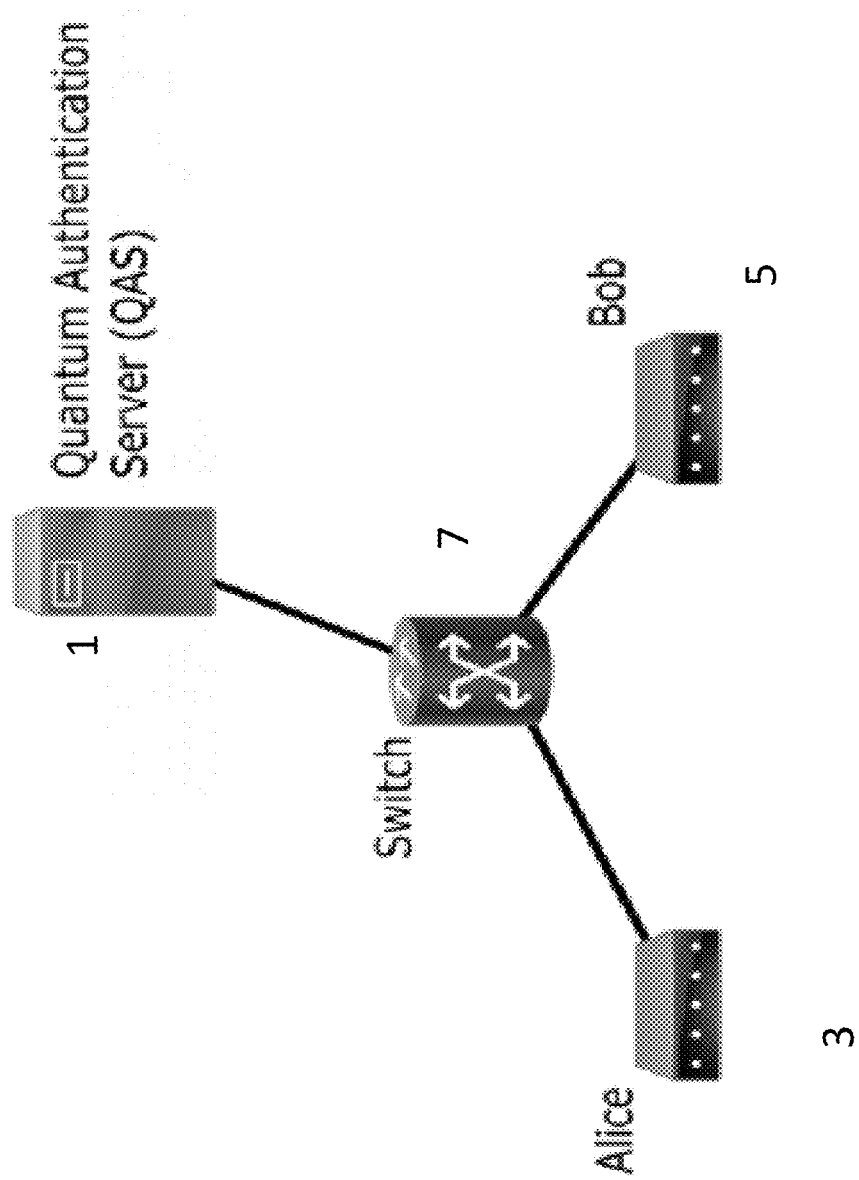
FIG. 1 is a schematic of a QAS in accordance with an embodiment.

FIG. 1 is a schematic of a quantum network in accordance with an embodiment, the network comprises a quantum authentication server "QAS" 1, a first node 3 (which will be referred to as "Alice") and a second node 5 (which will be referred to as "Bob").

The details of the nodes of Alice 3 and Bob 5 will be described later. The QAS, Alice 3 and Bob 5 are connected to each other via a switch 7. The switch 7 is configured such that QAS 1 can selectively communicate with either Alice 3 or Bob 5 or so that Alice 3 and Bob 5 can communicated with one another.

In the example of FIG. 1, the QAS 1, Alice 3, Bob 5 and the switch 7 are linked by optical cables. However, one or more of the connections could be provided by free space. Also, in this example, two nodes (Alice 3 and Bob) are shown to explain the concept in its simplest form. However, the system may be configured to incorporate more than two nodes and possibly multiple switches and multiple QASs.

Prior to considering the arrangement of FIG. 1, a brief overview of quantum communication will be given.

A basic quantum communication protocol which uses polarisation will now be explained. However, it should be noted that this is not meant as limiting and other polarisation based protocols could also be used. Further, the above server could be used with any QKD system and is not limited to uses with polarisation. For example, phase or energy/time based QKD protocols could also be used.

The protocol uses two bases wherein each basis is described by two orthogonal states. For this example the basis of horizontal/vertical (H/V) and Diagonal/Antidiagonal D/A. However, the left circularly polarized/right circularly polarized (L/R) basis could also be selected.

The sender in the protocol prepares states with one of H, V, D or A polarisation. In other words, the prepared states are selected from two orthogonal states (H and V or D and A) in one of two basis H/V and D/A. This can be thought of as sending a signal of 0 and 1 in one of two basis, for example H=0, V=1 in the H/V basis and D=0, A=1 in the D/A basis. The pulses are attenuated so that they comprise on average, one photon or less. Thus, if a measurement is made on the pulse, the pulse is destroyed. Also, it is not possible to split the pulse.

The receiver uses a measurement basis for the polarisation of a pulse selected from the H/V basis or the D/A basis. The selection of the measurement basis can be active or passive. In passive selection the basis is selected using fixed components, such as a beam splitter. In "active" basis choice, the receiver makes a decision which basis to measure in—e.g. using a modulator with an electrical control signal. If the basis used to measure the pulse at the receiver is the same as the basis used to encode the pulse, then the receiver's measurement of the pulse is accurate. However, if the receiver selects the other basis to measure the pulse, then there will be a 50% error in the result measured by the receiver.

To establish a key, the sender and receiver compare the basis that were used to encoder and measure (decode). If they match, the results are kept, if they do not match the results are discarded. The above method is very secure. If an eavesdropped intercepts the pulses and measures then, the eavesdropper must prepare another pulse to send to the receiver. However, the eavesdropper will not know the correct measurement basis and will therefore only has a 50% chance of correct measuring a pulse. Any pulse recreated by the eavesdropper will cause a larger error rate to the receiver which can be used to evidence the presence of an eavesdropper. The sender and receiver compare a small part of the key to determine the error rate and hence the presence of an eavesdropper.

Although the above has been described in relation to polarisation this is as an illustration. Other QKD protocols could be used which are based on phase or other systems such as energy/time.

The above QKD requires two channels, a "quantum channel" which is used for the communication of pulses that contain, one average, one photon or less, and a classical channel which is used for discussion of the basis ("sifting"). Also, the classical channel can be used for further communication once the key has been established on the quantum channel. It should be noted that the term "channel" is used to refer to a logical channel. The quantum and classical channels may be provided within the same physical fibre.

However, for the sifting process, the classical channel also needs to be authenticated. This means that, without doubt, it can be verified that the classical messages communicated between Alice and Bob were sent by the other party and not tampered with in transit. In other words, this avoids a man-in-the-middle attack. Authentication could be done using public key cryptography (e.g. RSA). However, in an embodiment, Alice and Bob authenticate each other using a pre-shared symmetric key (PSK).

For completeness, it is noted that if two parties share a private key, they can authenticate each other using many different methods. One method involves the use of a message authentication code (MAC). Here, the sender (e.g. Alice) and the receiver (e.g. Bob) share a key (PSK).

Alice then generates a MAC by inputting a message and the PSK into a known MAC algorithm. The generated MAC and the message are then sent to Bob. Bob then inputs the message and his PSK into the known MAC algorithm and compares the output with the MAC sent by Alice. If they match, he knows that the message and MAC codes that he has received have been sent by Alice. Alice can authenticate Bob by asking Bob to repeat the process using a different message and sending the newly generated MAC and message back to Alice. Alice can then input in the new message into her algorithm with her key to see if her newly generated MAC code matches the one sent by Bob.

However, the situation can arise where Alice and Bob do not already share a PSK or it is known that the PSK that they share has been compromised. In this case, the QAS in the system of FIG. 1 is used to allows Alice and Bob to authenticate.

Such an operation will now be described with reference to FIG. 2.

To avoid unnecessary repetition, like reference numerals will be used to denote like features.

Figure 2:
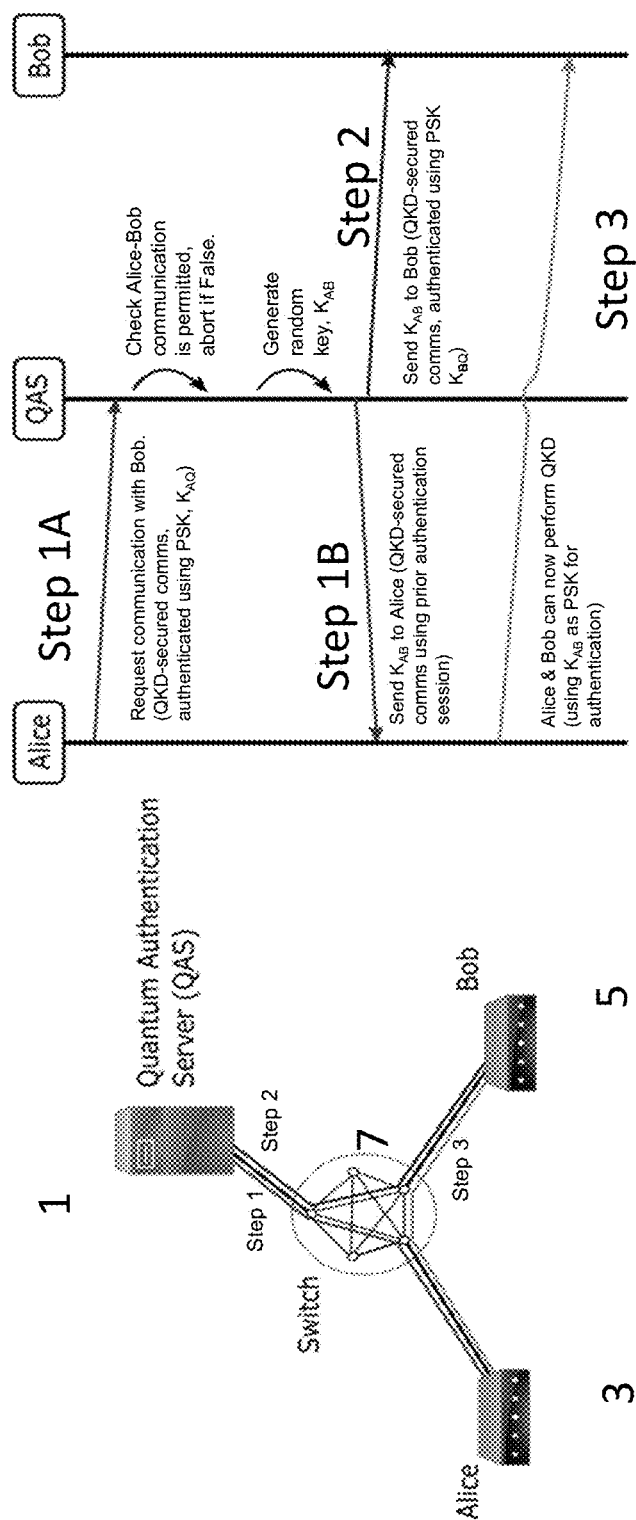
FIG. 2 is a schematic showing the messages passed between the QAS and two user nodes.

In the system of FIG. 2, Alice 3 and Bob, both share a PSK with the QAS 1. The PSK shared between Alice and the QAS allows Alice 3 to perform QKD with the QAS and authenticate with the QAS. The PSK shared between Bob and the QAS allows Bob 5 to perform QKD with the QAS and authenticate with the QAS.

Alice 3 wishes to securely communicate with Bob, but they do not share a PSK. However, they both share PSKs with the QAS and the QAS 1 can be used to authenticate each other.

In step 1, the switch 7 is configured connect Alice and the QAS. In an embodiment, each user could have a switch and form a meshed network. Alternatively, as shown, there is be a single centralised switch. The centralised switch could be controlled by the QAS, or some other high-level network controller.

In this embodiment, a symmetric PSK, $K_{AQ}$, has been installed into both Alice 3 and the QAS 1. Therefore, Alice 3 and the QAS can authenticate each other and thus perform QKD to securely communicate. In step 1, Alice 3 requests to communicate with Bob 5 and this request is sent to the QAS 1 as shown as step 1A.

The QAS 1 checks its internal database, which will be described in more detail later, to see if it trusts Bob 5 (i.e. if it shares a PSK with Bob, $K_{BQ}$). In further embodiments, the QAS 1 may also be configured to check rules to see if Alice and Bob are allowed to communicate.

Once the QAS approves that. Alice 3 and Bob 5 can communicate, the QAS 1 generates a random number (e.g. using an internal QRNG) which will become the PSK used by Alice and Bob to authenticate, $K_{AB}$.

The QAS 1, then uses the QKD link between it and Alice 3 to generate a QKD key using a known QKD protocol, for example, the basic QKD protocol described above. Communication over a classical channel is then performed by Alice 3 and the QAS 1 as part of the sifting process where the classical communication between Alice 3 and the QAS is authenticated using the $K_{AQ}$. Once the QKD key has been established between Alice 3 and QAS 1, this is then used to encrypt $K_{AB}$ to send to Alice in Step 1B.

In step 2, the switch 7 connects the QAS 1 and Bob 3. The QAS 1 and Bob 5 authenticate using the PSK which was installed by the manufacturer previously, $K_{BQ}$. Bob 5 and the QAS 1, then perform QKD to establish a QKD key between Bob 5 and the QAS. The sifting process is performed using an authenticated classical channel between Bob and the QAS 1 using $K_{BQ}$. Once QKD has been performed and a QKD key has been established between Bob 5 and the QAS, the PSK key $K_{AB}$ is then encrypted using the quantum key and sent to Bob 5.

Thus, Alice and Bob share a symmetric random key $K_{AB}$. Finally, in step 3, the switch 7 connects Alice and Bob via an optical link. Alice 3 and Bob 5 now use $K_{AB}$ to authenticate and to perform QKD to securely communicate.

In the above embodiment, all messages passing over communication channels in this procedure can be encrypted using QKD keys and authenticated using PSKs that were either pre-stored or communicated using encryption using QKD, thus ensuring complete security.

In an embodiment, the PSKs ($K_{AQ}$, $K_{AB}$ and $K_{BQ}$) are used just once. For example for ITS security using Wegman-Carter style message authentication codes, PSKs should only be used once. Therefore, in an embodiment, once 2 users have authenticated and started performing QKD, they discard the previous PSK between them. They can then reserve some of the freshly generated quantum keys in a 'PSK key store' ready for future authentication sessions. Thus, once authenticated, users can securely communicate using QKD without needing to contact the QAS 1 each time. In other words, when QKD is used to establish a key, part of the key is used for encrypting the messages to be sent and part of the key is reserved to be an authentication key for the next time QKD will be performed.

Network administration (e.g., signalling the optical switch 7 to reconfigure links) could be performed using the same channel as occupied by the quantum signals, or alternatively, a separate public communication channel (e.g. the classical internet). This is compatible with new network architectures that employ software-defined networking (SDN), as well as conventional networks.

Figure 3A:
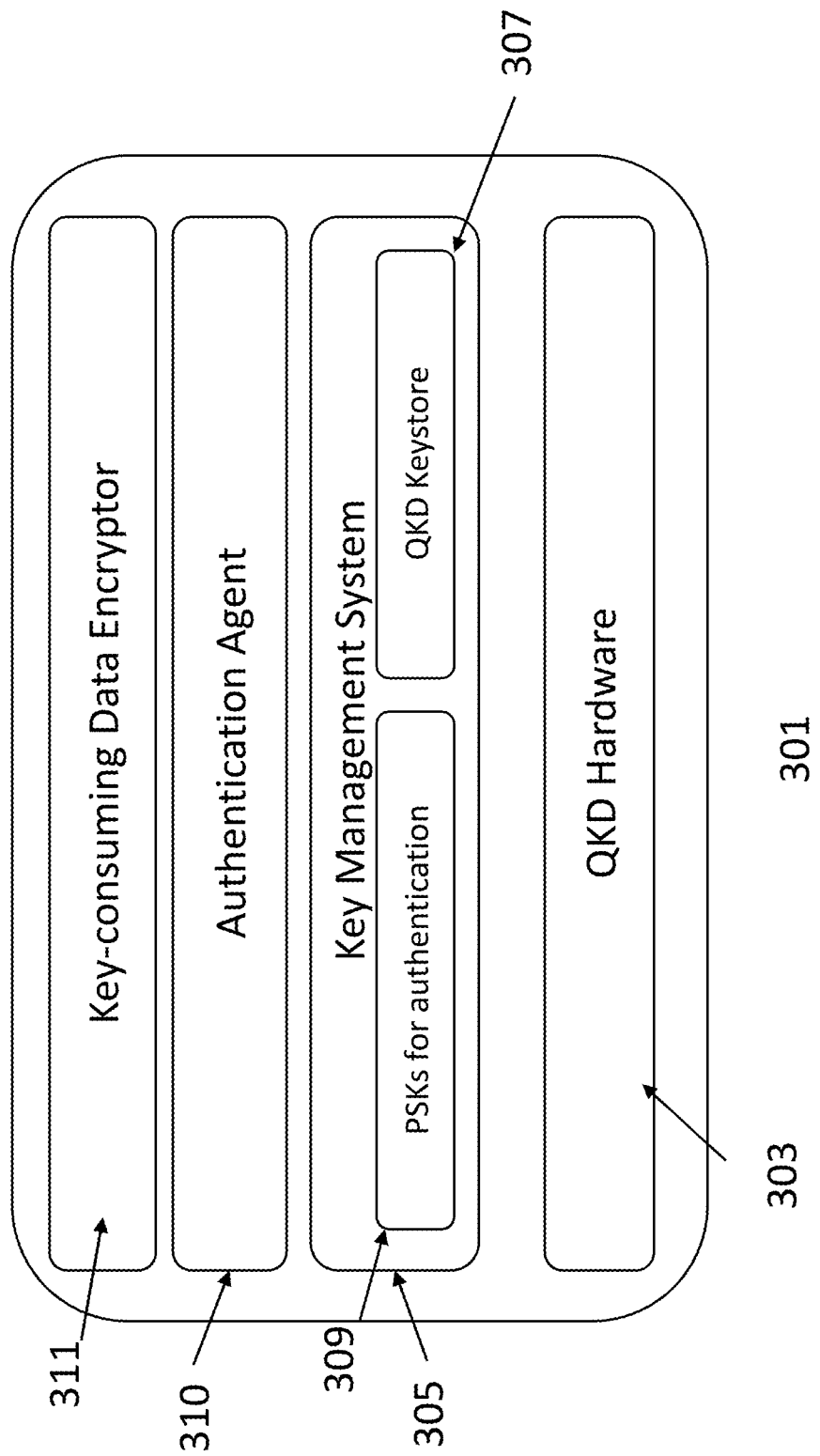

FIG. 3A shows in detail the components of one of the nodes, for example Alice 3 or Bob 5. FIG. 3B shows in detail the components of the QAS 1.

Turning first to the node of FIG. 3A, node 301 comprises QKD hardware for generating quantum keys 303. The QKD hardware can comprise a quantum transmitter and a quantum receiver.

Figure 4A:
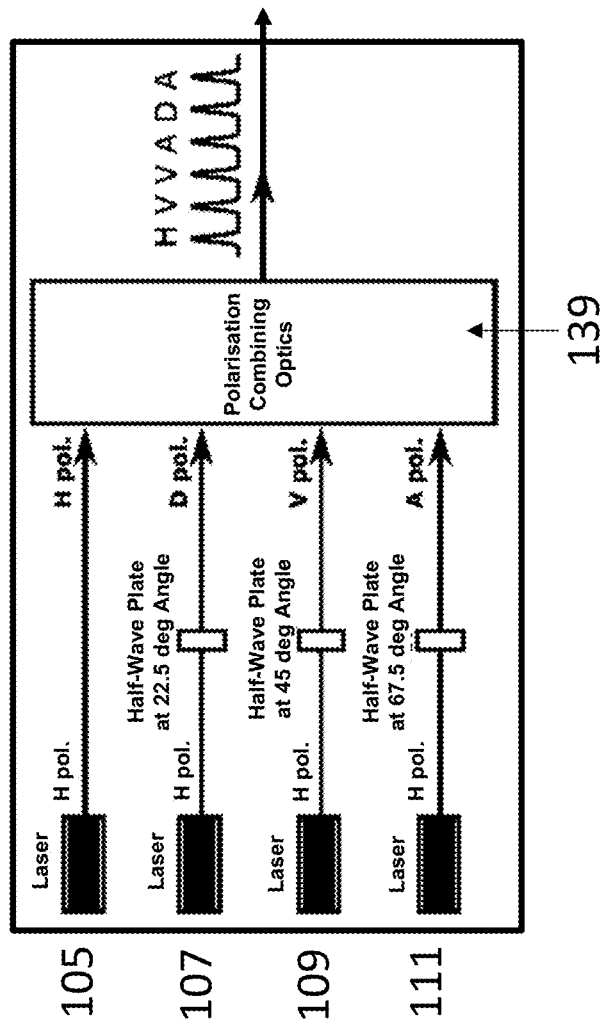
FIG. 4A is a schematic of a QKD transmitter.

An example of a possible transmitter is shown as 101 in FIG. 4A. The transmitter can be any type of quantum transmitter which is capable of emitting polarisation encoded photons. In this particular example, the transmitter 101 comprises four lasers, 105, 107, 109 and 111 each of which emit horizontally polarized light. The output from laser 105 is provided towards polarisation combining optics 139. The output from laser 107 is provided towards polarisation combining optics 139 via a half wave plate which is configured to convert the horizontally polarized light to diagonally polarized light. The output from laser 109 is provided towards polarisation combining optics 139 via a half wave plate which is configured to convert the horizontally polarized light to vertically polarized light. The output from laser 111 is provided towards polarisation combining optics 139 via a half wave plate which is configured to convert the horizontally polarized light to anti-diagonally polarized light.

Polarisation combining optics allows the different polarisations to be combined into a stream of pulses with randomly varying polarisations. This may be achieved in many different ways. For example, the lasers may be pulsed lasers and a controller (not shown) is provided to randomly select a laser from lasers 105, 107, 109 and 111 to randomly output a pulse such that one pulse at a time reaches the polarisation combining optics. In other embodiments, the polarisation combining optics or a further component may be configured to randomly select the output from one laser or randomly selectively block the output from three lasers to allow for the pulsed output stream. The pulses may be produced by pulses lasers or cw lasers may be used with a further component to chop the output into pulses.

An attenuator (not shown) is then used to attenuate the output of the pulses so that they contain on average less than one photon. Alternatively, single photon emitters can be used instead of lasers 105, 107, 109 and 111.

Figure 4B:
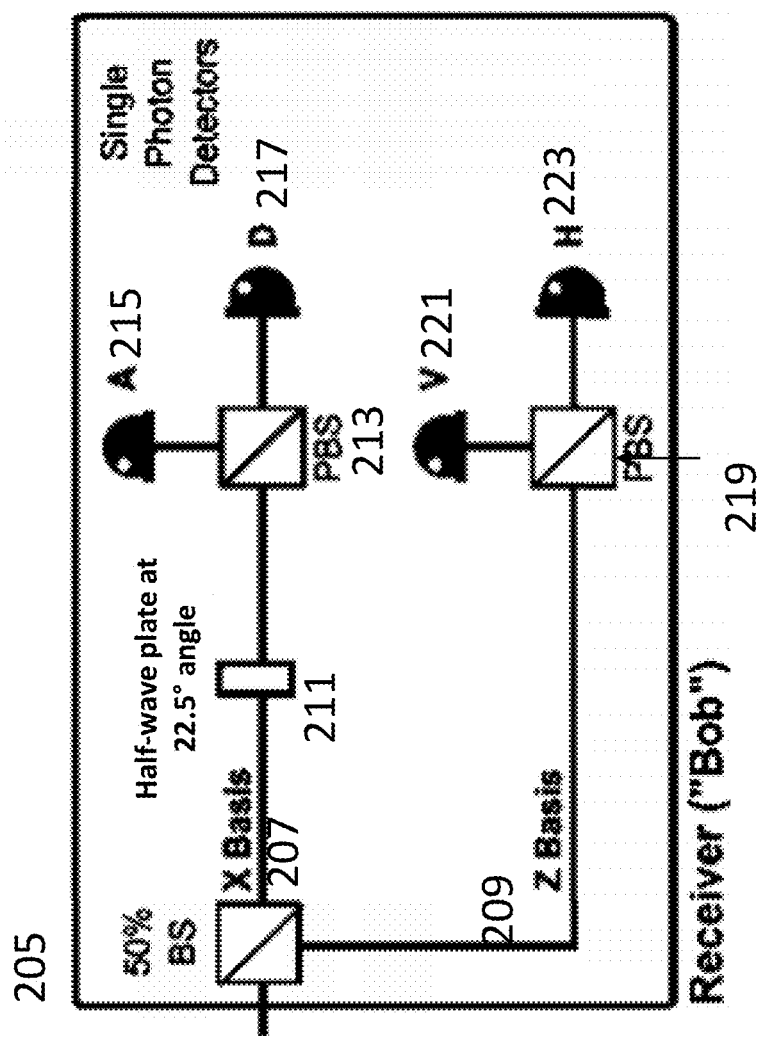
FIG. 4B is a schematic of a QKD receiver.

A simplified form of the receiver is shown in FIG. 4B. The receiver comprises a 50-50 beam splitter 205 which will direct the incoming pulse either along first measurement channel 207 or a second measurement channel 209. Since the pulses contain on average less than one photon, the 50-50 beam splitter 205 will direct the pulse randomly along one of the first measurement channel or the second measurement channel. This has the result of selecting a measurement basis to be the X (D/A) basis or the Z (H/V) basis. The non-polarising beam splitter 205 functions to allow random selection of one of the two bases.

The first measurement channel is for the X basis which corresponds to the D/A bases, Here, a half wave plate 211 is provided to rotate the polarisation by 45 degrees between the two detection branches, i.e. giving the 2 measurement bases X and Z. The output of the half wave plate 211 is then directed towards polarising beam splitter 213. Polarising beam splitter 213 directs pulses with anti-diagonal polarisation towards anti-diagonal detector 215 and pulses with a diagonal polarisation towards diagonal detector 217. Detectors 215 and 217 are single photon detectors, for example avalanche photodiodes.

Pulses directed along the second measurement channel are measured in the Z basis to determine if they are horizontal or vertical. Here, the pulses directed into the second measurement channel are directed toward polarising beam splitter 219 which directs vertically polarised pulses towards detector 221 and horizontally polarised pulses towards detector 223. Again, detectors 221 and 223 are single photon detectors.

If a photon is received which is polarised in the D/A bases and this is randomly sent to be measured in the Z bases along the second management channel 209, one of detectors 221, 223 are likely to register a count. However, this result cannot be trusted as a photon received at polarising beam splitter 219 has a 50-50 chance of being directed towards either the vertical or the horizontal detector.

In an embodiment, the QKD hardware 303 in node 301 will comprise both a transmitter and a receiver dependent on whether the node is to work as a transmitter or a receiver during the QKD process. However, it is possible for the node to contain just a transmitter if it will just perform QKD with nodes or a QAS which has a receiver and also a node may contain just a receiver if it will just perform QKD with nodes or a QAS which has a transmitter.

The node 301 also has a key management system 305. The key management system manages key exchange and storage. In the example of FIG. 3A the key management system 305 comprises a QKD store 307 which stores the key established via QKD which is to be used for encrypting communications and PSK storage which is allocated to save PSKs that the user has shared with other network users (and the QAS) which can be used for authentication. Some of these PSKs may be pre-stored in the node prior to use, others may be received from the QAS (encrypted vis a quantum key), other PSKs may be reserved parts of keys generated using QKD.

The node 301 also comprises a key consuming encryptor 311. The data encryptor uses QKD keys to encrypt/decrypt data communications (e.g. using the one-time-pad or an alternative cipher such as AES).

The node may also comprise an authentication agent/unit 310 which is used during authentication. This may be a standalone component or part of any of the other components of the user node 301, for example the key consuming data encryptor.

FIG. 3B shows the components of the QAS 321. The components comprise QKD Hardware 323, key management system 325 (with QKD storage 329 and PSK storage 327), key-consuming data encryptor 331 and authentication unit/agent 330. In an embodiment, the QKD hardware 323 of the QAS will be the same as the QKD hardware 303 of the user node 301. However, as explained above, the QKD hardware in a user node 301 may be provided with just a QKD receiver. However, the QKD hardware 323 of the QAS, would comprise a QKD transmitter. In many embodiments a QKD receiver and transmitter would be provided in the QKD hardware 323 of the QAS 321.

In an embodiment, the key management system 325 of the QAS will be largely the same as the key management system 305 of the user node 301. However, it is likely that the QAS will store PSKs for more user nodes and other nodes than those stored in a user node.

In an embodiment, the key consuming data encryptor 331 of the QAS is the same as the key consuming data encryptor 311 of the user node 301.

In an embodiment, the authentication unit/agent 330 of the QAS is the same as the authentication unit/agent. 310 of the user node 301.

In addition, the QAS may further comprise a database of users and an active control list. The database of users on the network may comprise a database of the users for whom it shares PSKs for authentication. The access control list is a list which enables network administrators to define which users are allowed to communicate.

The QAS 321 may also comprise a policy management module which allows the QAS to control certain policies, for example the policy management module could enforce fixed session length. For example, when the QAS creates a PSK to share between 2 users, the policy management module 335 could include additional metadata dictating to the users how the key must be used.

The QAS 321 could also include a revocation list (not shown), such that previously trusted hosts could be banned. This feature would allow the QAS 321 to securely message all its trusted users (i.e. for whom it can securely authenticate using its PSKs) to tell them to distrust a certain user.

The QAS will also comprise a random number generator 337 which will be used to generate a random number to form a new PSK to be encrypted and sent two nodes to allow them to authenticate with each other. Also, the random number generator can be used to control the transmitter and/or receiver in the QKD hardware 303 to provide random control of the basis during QKD.

Figure 5A:
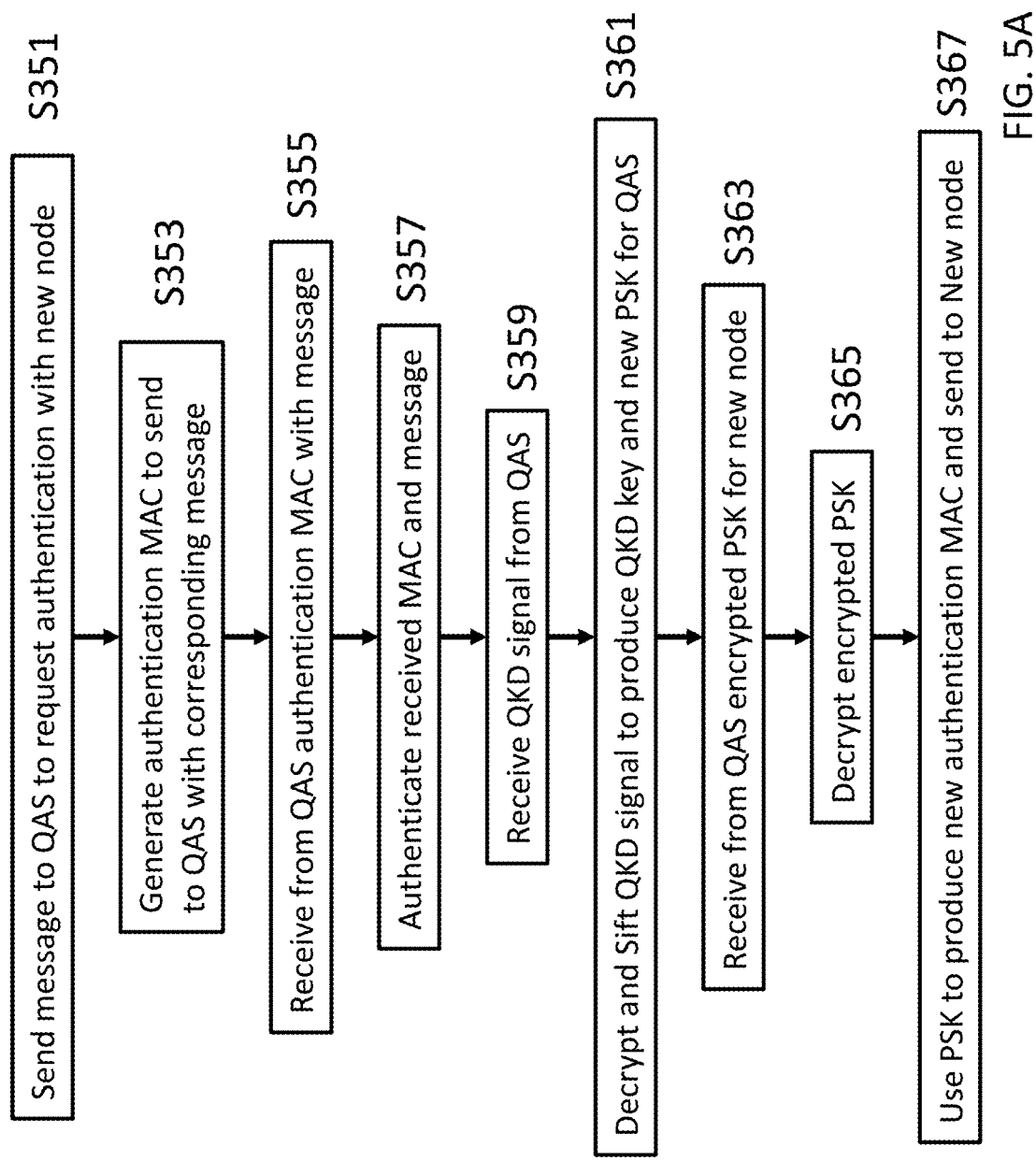
FIG. 5A is a flow chart showing the steps performed by a user node when requesting a PSK.

FIGS. 5A and SB are flow chart which summarise the operations performed by a user node and the QAS respectively in accordance with an embodiment.

A user node, for example Alice, performs the steps of the method of FIG. 5A. In step S351, Alice sends a message to the QAS to request authentication with a new node (Bob). Alice then needs to authenticate with the QAS. Using the above described example, authentication is performed using a MAC code which is produced by inputting a message and a PSK (which has been pre-shared between the QAS and Alice). In step S353, Alice generates an authentication MAC centre the QAS with the corresponding message as described above.

Independently, in step S355 Alice receives from the QAS an authentication MAC with a message. In this flowchart step S355 is shown following step S353. However, these steps could take place in the reverse order or take place simultaneously. Possibly, one or more of the steps could take place prior to the sending of the message in step S351.

To determine whether Alice trusts the QAS, Alice authenticates the message received in step S355 by inputting the message and her own PSK key into a pre-agreed algorithm to see she matches the MAC code.

Once the authentication has taken place and Alice knows that she can trust the QAS (ensuring there is no man-in-the-middle attack), Alice and the QAS perform QKD as described above. In this example, it is assumed that Alice receives the QKD signal (i.e. the encoded light pulses) and the pulses are produced from the QAS. In step S361, Alice then decrypts the QKD signal by changing her measurement basis. In this embodiment, a longer key is extracted from the QKD protocol than is strictly required. Part of the longer key will be users the QKD key and another part of the shared key will be saved as a new PSK for Alice and the QAS.

Once Alice and the QAS have shared the QKD key, Alice then receives in step S363, a key which is encrypted by the QKD key. This key which is encrypted by the QKD key is the PSK that she will now share between her and the new node ($K_{AB}$). Alice then decrypts the new key ($K_{AB}$) in step S365.

Alice can then use KAB to start authentication the new node (Bob). The first step of this is shown in step S367 where Alice uses the PSK to produce a new authentication MAC and sends it to the new node.

Figure 5B:
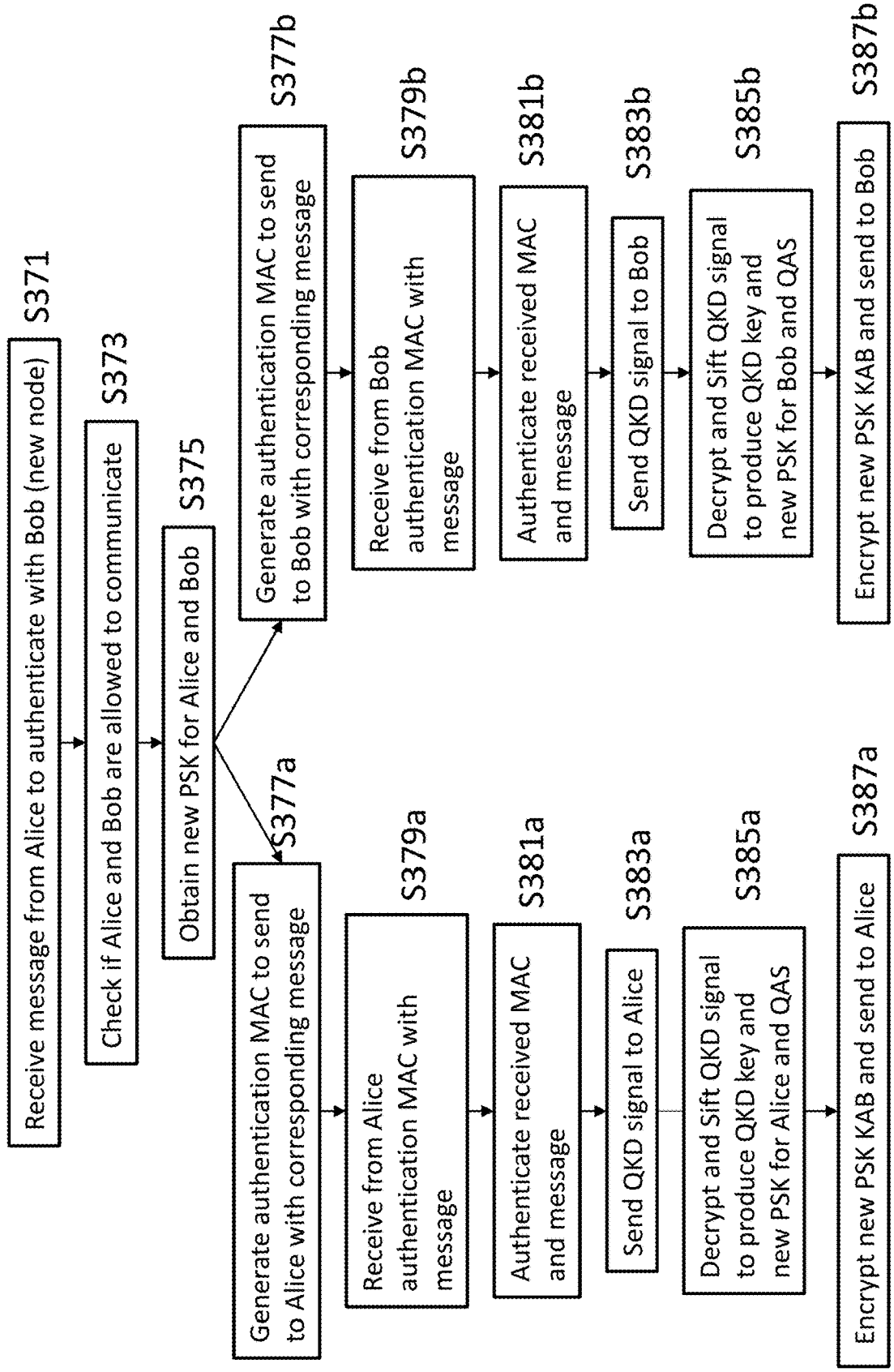
FIG. 5B is a flow chart showing the steps performed by a QAS when responding to the requests of the user node of FIG. 5A.

FIG. 5B set out the steps performed by the QAS. In step S371, the QAS receives a message from Alice to authenticate with a new node (for example Bob) stop at this point, the QAS checks in step S373 with its access control list to see if Alice and Bob are allowed to communicate. If they are, the QAS then obtains a new PSK for Alice and Bob to use. As explained with reference to FIG. 3B, the QAS can use its random number generator to generate a PSK once it receives a request. However, the QAS may also have pre-stored random numbers ready to use as PSK's.

The new PSK will be called $K_{AB}$.

In step S377a, the QAS generates an authentication MAC to send to Alice with a corresponding message it also receives from Alice an authentication MAC with a message in step S379a, It should be noted that steps S377a and S379a can be performed simultaneously or in the reverse order. Also, it is possible for the authentication steps of S377a and S379a to be performed prior to the receipt of message in step S371 or before any of the previously described steps.

Once the QAS has received the authentication MAC with message, the QAS authenticates this in step S381a. To do this, the QAS inputs the received message and the PSK that they, are sharing with Alice and compares the generated MAC to the one received from Alice.

Once this has been completed, the QAS starts to perform QKD with Alice in step S383a. In this embodiment, the QAS sends encrypted light pulses to Alice. The QAS encrypts the light pulses by preparing light pulses with a randomly changing basis as described above. The QAS performs sifting to produce the QKD key in step S385a. Sifting may be prepared by receiving information over the authenticated channel from Alice indicating the measurement basis that she used. The QAS then sends information to Alice over the classical channel to advise her of which results were measured with the correct basis. The QAS then only retains the results of the pulses that were measured with a basis that matched the preparation basis to produce the QKD key.

In this example, a longer key is prepared by the sifting process than is needed for QKD. The excess key is then saved as one or more PSKs to allow the QAS and Alice to have a new PSK $K_{AQ}$, to use when they next need to authenticate.

The QAS then encrypts $K_{AB}$ with the QKD key material generated by performing QKD between Alice and the QAS, and sends this to Alice.

The above has been described for communication with Alice. However, the QAS also performs the same steps for communication with Bob. In the flow chart of FIG. 5B, steps S377b, S379b, S381b, S383b, 385b and S387b correspond to steps S377a, S379a, S381a, S383a, 385a and S387a respectively, except that the steps with the "a" suffix relate to steps performed by the QAS in relation to Alice and steps with the "b" suffix relate to steps performed by the QAS in relation to Bob. Steps S377b, S379b, S381b, S383b, 385b and S387b may be performed at the same time as steps S377a, S379a, S381a, S383a, 385a and S387a, interleaved with these steps or performed before or after them.

Alice receives the PSK $K_{AB}$ in step S387a and Bob receives the PSK $K_{AB}$ in step S387b which allows Alice and Bob to authenticate their classical channel.

Figure 6:
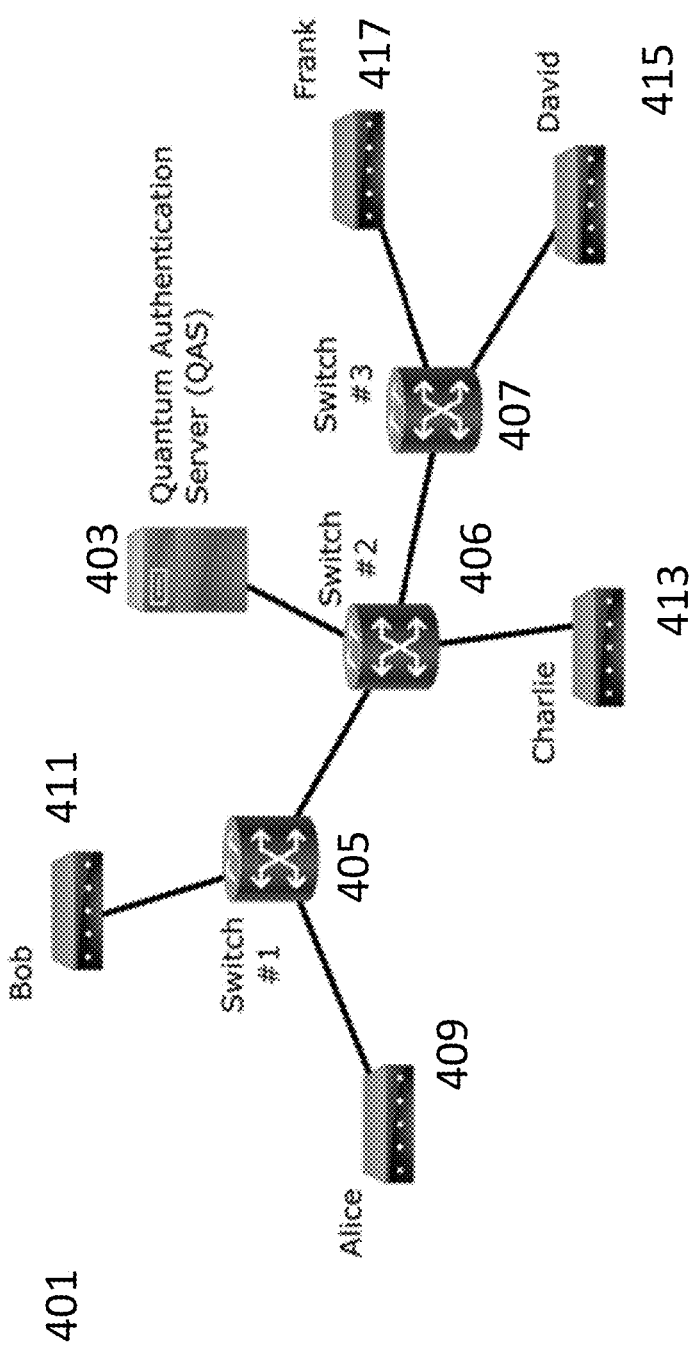
FIG. 6 is a schematic of a network comprising a QAS in accordance with an embodiment.

The network of FIG. 1 is scalable. FIG. 6 shows a network 401 in accordance with a further embodiment which comprises a single QAS server 403, but has three switches 405, 406 and 407 which, in this example, supports five user nodes, Alice 409, Bob 411, Charlie 413, David 415 and Frank 417.

Alice 409 and Bob 411 are connected to switch 405, David 415 and Frank 417 are connected to switch 407. Switch 405 and Switch #3 407 are connected to switch #2

406 along with Charlie 413 who is also connected to switch #2 406. This arrangement means that Alice can communicate with Bob via switch #1 405 and Alice can communicate with the QAS 403 via switch #1 405 and switch #2 406, both of which need to be controlled to allow both classical communication and QKD to be performed between Alice 409 and the QAS 403.

The network of FIG. 6 can be used as a metro-scale network where each user is in a different building, with 5 users and 3 optical switches, as well a single QAS. Authentication between any pair of users is possible using the previously outlined protocol, where the QAS 403 establishes a PSK between the users.

The above embodiments have related to the use of the QAS for authentication and particularly for authentication of a classical channel for use in QKD. However, there are other uses, for example sessions on a quantum computer or access to a network file server. The QAS could also be used to provide authentication for users to access these resources, where the ability to include user management and access control within the QAS enables simple network administration.

Figure 7:
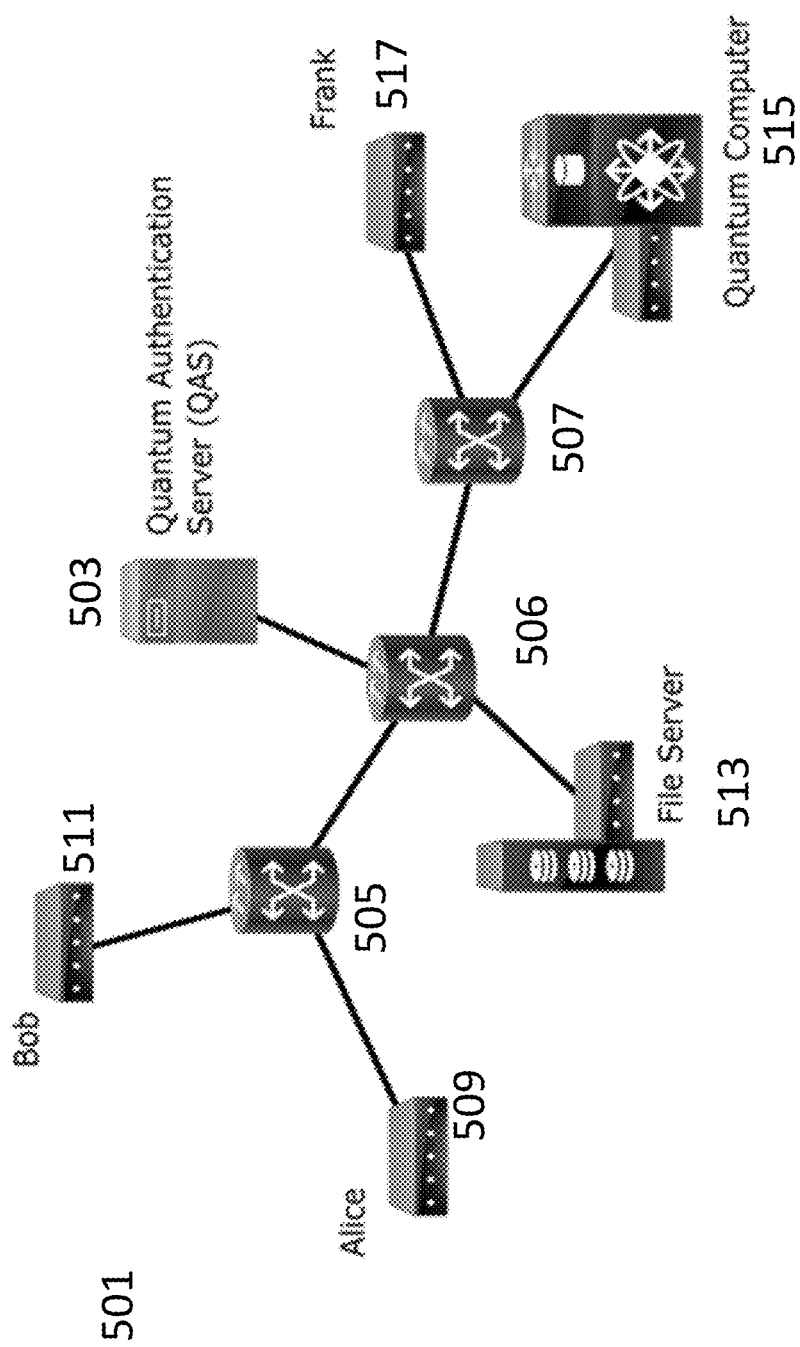
FIG. 7 is a schematic of a network comprising a QAS, quantum computer and file server in accordance with an embodiment.

The network of FIG. 7 relates to a network which is similar to the network of FIG. 6, but also comprises a file server and a quantum computer. The network of FIG. 7 comprises a single QAS server 503, and has three switches 505, 506 and 507 which, in this example, supports three user nodes, Alice 509, Bob 511, and Frank 517. The network also comprises a quantum computer 515 and a file server 513.

Alice 509 and Bob 511 are connected to switch #1 505, quantum computer 515 and Frank 517 are connected to switch 507, Switch #1 505 and Switch #3 507 are connected to switch #2 506 along with a file server 513 who is also connected to switch #2 506. This arrangement means that Alice can communicate with Bob via switch #1 505 and Alice can communicate with the QAS 503 via switch #1 505 and switch #2 506, both of which need to be controlled to allow both classical communication and QKD to be performed between Alice 509 and the QAS 503.

Alice 509 can communicate with the file server 513 via switch #1 505 and switch #2 506. The file server 513 can communicate with the QAS 503 via switch #2 506. The above embodiments have discussed the use of using a PSK for authentication. However, in FIG. 7, the File server 513 is capable of performing QKD with the QAS and the QAS can then provide both Alice 509 and the file server 513 with a PSK in the same manner as described above in relation to communication between Alice and Bob.

The file server 513 can then authenticate a message received from Alice using the PSK and Alice can authenticate a message received from file server 513 to ensure that she is sending messages to file server 513 and file server 513 can authenticate a message from Alice to make sure that the communications that it believes are from Alice are from Alice.

Alice 509 can also communicate with the quantum computer 515 via switch #1 505, switch #2 506 and switch #3 507. The quantum computer 515 can communicate with the QAS 503 via switch #2 506 and switch #3 507. The above embodiments have discussed the use of using a PSK for authentication. However, in FIG. 7, the quantum computer 515 is capable of performing QKD with the QAS and the QAS can then provide both Alice 509 and the quantum computer 515 with a PSK in the same manner as described above in relation to communication between Alice and Bob.

The quantum computer 515 can then authenticate a message received from Alice using the PSK and Alice can authenticate a message received from quantum computer 515 to ensure that she is sending messages to quantum computer 515 and quantum computer 515 can authenticate a message from Alice to make sure that the communications that it believes are from Alice are from Alice.

The above have been described in relation to Alice. However, any of Alice 509, Bob 511 or Frank 517 could communicate with the file server 513 and/or the quantum computer 515. The file server 513 and the quantum computer 515 may also wish to authenticate with one another, for example, if the quantum computer 515 needs to access the file server 513.

Communication between a user, say for example, Alice and either the file server 513 or the quantum computer 515 can be performed using the PSK which has been shared by the QAS 503. In other embodiments, Alice communicates with either the file server 513 or the quantum computer 515 using QKD. This means that Alice communicates with them by establishing a quantum key as described above (the shared PSK being used to authenticate the classical channel) and then all communications for the session are encrypted using the shared PSK from the QAS. New PSKs can be generated from the key established during QKD as described above.

The network is highly scalable as shown in FIG. 8. In this case, multiple QASs 802, 803, 805 and 807 are included in a network. The arrangement shown in FIG. 8 can be viewed as three local networks 813, 815 and 817 each of which has its own QAS (803, 805 and 807 respectively). The three local networks 813, 815 and 817 are connected to QAS 802 which will be termed a "root" QAS 802. The root QAS 802 and the local QASs 803, 805 and 807 form a hierarchy with the root. QASs 802 at the top of the hierarchy.

In this embodiment, the first network 813 has three switches 809a, 809b and 809c, the second switch, 809b of the first network 803 is connected to the QAS 805 of the second network via switch 821. Switch 821 is connected to the first network 813 and the second network 815 via long distance QKD links. Long distance QKD links may be a continuous optical fibre or an optical fibre with quantum repeaters. Switch 821 is also connected to the root QAS 802.

The third local network 801 is connected to the root QAS 802 via a satellite link.

When a user, for example user 811, requests to authenticate another user with the QAS, the request is first sent to its local QAS 803. If this QAS 803 does not have a PSK for the requested user in its database, it can relay the request to another QAS (analogous to how much of the classical internet infrastructure works). In an embodiment the multiple QASs are arranged in a hierarchical manner with all requests that cannot be serviced via a local QAS being sent to the root QAS 802. The QAS servers may be linked by long distance QKD optical fibre links, or even satellites, enabling wide-scale quantum networks. Quantum repeaters may be used in long distance QKD links to allow long distances to be achieved.

In an embodiment, a 'root' QAS server could be operated on-premises at a QKD manufacturer. This enables the manufacturer to securely install PSK into the root QAS for all its new manufactured systems (we assume the manufacturers' premises is a trusted secure location—which is a general assumption for QKD hardware). This PSK material for its systems can then be distributed out to remote metro networks over QKD links from the manufacturer premise to the various metro networks, which each have their own local QAS.

In another possible embodiment, intermediate trusted nodes between two users (or two QAS) could be used to relay a global key between them, where this global key can later be used as PSK for authentication.

Under some circumstances, it may not be possible for all users to form an optical link to the QAS. This could be, for example, due to network congestion (i.e. busy optical switch) or if the users are connected in a sparse mesh with few links between them.

FIG. 9 shows a possible embodiment where the QAS 901 can give its own PSK with the target user to a trusted user that requests it. For example, consider a network where Alice 903 wishes to communicate with Bob 905, but Bob 905 cannot be optically connected to the QAS 901.

In this case, Alice 903 authenticates herself with the QAS 901 and requests a PSK with Bob. The QAS checks its policy and user access control list and if permitted, sends Alice the PSK it shares with Bob, $K_{BQ}$ (communicated over the QKD-secured link (i.e. encrypted using QKD keys generated between Alice and the QAS)). To avoid key-reuse, the QAS can discard the PSK from its database.

Alice and Bob now share a symmetric PSK. Thus, the optical switch can connect a quantum link between them and they can authenticate using the PSK $K_{BQ}$. They can thus perform QKD and generate new quantum keys to use for secure communications. The final step in this embodiment is that some generated QKD key material is reserved as a new PSK for Bob to use for authenticating the QAS. After finishing QKD with Bob, Alice reconnects with the QAS and securely sends it a new PSK that is shared with Bob, $K_{BQ}'$. Otherwise, if this final step was skipped, the QAS would be unable to authenticate Bob in future sessions (since it gave its PSK to Alice initially).

This embodiment has the benefit of requiring fewer quantum links to be used between the users for secure communications. However, a downside is that should network failure occur before the process is completed, the QAS could be left without a PSK for authentication with Bob. The embodiment described earlier is therefore a more robust approach in practice. However, we have outlined this concept too to illustrate that our approach and optical quantum network scheme could be adapted for many network topologies and use cases.

It is worth noting that by establishing an authentication PSK through the QAS, the QAS also knows the value of the PSK. Therefore, for the case of Alice and Bob authenticating using $K_{AB}$ issued by the QAS, the users must implicitly assume that the QAS is trusted, since it could potentially perform a man-in-the-middle attack to read secure communications between Alice and Bob. This is a reasonable assumption since the QAS would typically be securely located and managed (e.g. by the network operator or QKD manufacturer).

FIG. 10 shows a further embodiment, with 2 QASs 951 and 953 this assumption could be relaxed by using two QAS (or two nodes in a peer-to-peer scenario) in a network. Alice and Bob now obtain a PSK from each QAS (following previously outlined method), where we denote these PSKs $K1_{AB}$, and $K2_{AB}$, coming from QKD with the QAS Server 1 and 2, respectively. Alice and Bob then form their actual PSK, $K_{AB}$, by performing an XOR operation using these two keys:

$$K_{AB} = K1_{AB} \oplus K2_{AB}$$

This means that they share a symmetric shared key, but now this key is not shared by QAS1 or QAS2, providing resilience (against a man-in-the-middle attack) should either of these servers be compromised.

The above embodiments enable arbitrary remote users to perform authenticated communications, so they can commence a QKD session to generate additional key material. This QKD key material can then be used for secure communications of arbitrary large data sizes. We propose our invention to cover both the authentication system and the resulting optically switched quantum communication network design.

This avoids the need to manually install PSKs into each pair of QKD systems. Since the above provides a solution for authentication to be performed using network links rather than manually installing keys at each site with trusted couriers.

In addition to greatly simplifying implementation of authentication, the QAS system provides additional network management features, such as the ability to enforce access policies, such as user access control lists (including revocation should a user become compromised) and even enforcing time-limited sessions through key metadata. This concept is thus widely applicable for quantum networks, connecting both users for authenticated data communications, as well as providing trusted access management to network services such as file servers, quantum-computation and quantum sensing nodes.

The above embodiments enable users on quantum networks to securely communicate without manual installation of authentication keys.

Further, they provide a scalable design for networks, and even networks of networks over large geographical areas (compatible with various QKD protocols, e.g. TF-QKD for long-distances or satellite QKD). The above networks are compatible with free-space and fibre optics communications channels. Further, various embodiments of the concept are possible, supporting diverse network topologies.

Further, the above also provides abilities to support network administration and user management features and robustness against the unlikely event of a compromised authority server via XOR of multiple PSKs. Compared to classical/PQC approaches to authentication, the above embodiments are robust against advances in cryptanalysis and cryptographic attacks by quantum computers.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A server configured to provide a pre-shared key (PSK) with a first user node and a second user node, to allow the first user node and the second user node to share the PSK, the server comprising processing circuitry configured to:
receive a request for authentication of a first channel between the first user node and the server;
allow a quantum key to be distributed between the first user node and the server by performing quantum key distribution between the first user node and the server, the quantum key being sifted using communication over the first channel to establish a first quantum key between the first user node and the server;

provide a first PSK for the first user node to allow the first user node to authenticate with the second user node;

encrypt the first PSK with the quantum key to send to the first user node;

send a request for authentication of a second channel between the second user node and the server;

allow a quantum key to be distributed between the second user node and the server by performing quantum key distribution between the second user node and the server, the quantum key being sifted using communication over the second channel to establish a second quantum key between the second user node and the server; and encrypt the first PSK with the second quantum key to send to the second user node, wherein said server is configured to be arranged in a hierarchy with respect to a plurality of further servers, and said server is further configured to send a query to another server above it in the hierarchy when said server receives a request from a user node for a shared PSK which it cannot satisfy.

2. The server of claim 1, wherein the processing circuitry is further configured to generate the first PSK for sharing between the first and second user nodes.

3. The server of claim 1, wherein the first quantum key has a first length and the processing circuitry is further configured to distribute a key which is longer than the first length, the remainder of the key being saved as at least one PSK for further authentication between the server and the first user node.

4. The server of claim 3, wherein the server is further configured to discard a PSK after a single use.

5. The server of claim 1, wherein the processing circuitry is further configured to store information indicating whether two user nodes are allowed to share a PSK, the server being further configured to accept or decline a request from a user node for obtaining a shared key by referring to the information stored in the access control unit.

6. The server of claim 1, wherein the server is further configured to contact a further server to determine whether to accept or decline a request from a user node to obtain a shared key.

7. The server of claim 1, wherein the processing circuitry is further configured to provide information to control at least one of the quantum key length, a PSK key length and information to be sent with the PSK.

8. The server of claim 1, wherein the processing circuitry is further configured to:

encode information on light, wherein the information is encoded by randomly selecting one state from a plurality of states to send to said user node, the light leaving said server in pulses which contain on average less than one photon; and receive light pulses which contain on average less than one photon and decode information from said light pulses by measuring said light pulses, wherein the measurement basis for the measurement are randomly selected from a set of measurement bases to allow measurement of the states used to encode the information, allow the server to compare the basis it used for encoding or decoding with that used by the user node for decoding or encoding, and discard the information from pulses where the encoding basis and the decoding measurement basis did not match.

9. A network comprising a first server, a plurality of user nodes and at least one switch, the at least one switch being configured to allow selective connection between any two of said user nodes and any of said nodes and the server, the first server being a server in accordance with claim 1, wherein the network further comprises the plurality of further servers, and wherein the first server and the plurality of further servers are arranged in a hierarchy and the first server is configured to send a query to another server above it in the hierarchy when the first server receives a request from a user node for a shared PSK which it cannot satisfy.

10. The network of claim 9, further comprising two servers and wherein the first user node, in response to a request for a PSK to authenticate with a second user node comprises receiving a PSK from the two servers, the first node forming a combined PSK from the two servers, the second user node also deriving the combined PSK to allow the first node and the second node to authenticate.

11. The network of claim 9, wherein the at least one switch is located within at least one of a server or a user node.

12. The network of claim 9, wherein the user node comprises at least one selected from a file server or a quantum computer.

13. The network of claim 9, wherein the network comprises a plurality of sub networks and said sub networks are linked by communication channels.

14. A method of sharing a pre-shared key (PSK) between a first node and a second node in a network, the network further comprising a first server and a plurality of further servers, the first server and the plurality of further servers being arranged in a hierarchy, the method comprising:

receiving a request from the first user node for obtaining a PSK shared between the first user node and the second user node;

sending a query to another server above the first server in the hierarchy when the first server cannot satisfy the request;

receiving a request for authentication of a first channel between the first user node and the first server;

allowing a quantum key to be distributed between the first user node and the first server by performing quantum key distribution between the first user node and the server, the quantum key being sifted using communication over the first channel to establish a first quantum key between the first user node and the first server;

providing a first PSK for the first user node to allow the first user node to authenticate with the second user node;

encrypting the first PSK with the quantum key to send to the first user node;

sending a request for authentication of a second channel between the second user node and the first server;

allowing a quantum key to be distributed between the second user node and the first server by performing quantum key distribution between the second user node and the first server, the quantum key being sifted using communication over the second channel to establish a second quantum key between the second user node and the first server; and encrypting the first PSK with the second quantum key to send to the second user node.

15. The method of claim 14, wherein, by performing quantum key distribution, a key is distributed between the first user node and the first server that is longer than a first length to establish a first quantum key having the first length, and wherein the method further comprises saving the remainder of the key as at least one PSK for further authentication between the first server and the first user node.

\* \* \* \* \*